United States Patent [19]

Kimura et al.

[11] Patent Number: 5,129,131
[45] Date of Patent: Jul. 14, 1992

[54] METHOD OF AND APPARATUS FOR MANUFACTURING GLASS FIBER MAT

[75] Inventors: Hiroshi Kimura, Gifu; Makoto Maeda, Hashima; Toshiharu Hirai, Noda, all of Japan

[73] Assignee: Ube-Nitto Kasei Co., Ltd., Tokyo, Japan

[21] Appl. No.: 617,985

[22] Filed: Nov. 26, 1990

[30] Foreign Application Priority Data

Dec. 5, 1989 [JP] Japan ................................ 1-316199
Dec. 5, 1989 [JP] Japan ................................ 1-316200

[51] Int. Cl.$^5$ ............................................. D04H 1/46
[52] U.S. Cl. ................................ 28/107; 28/112; 65/2; 65/4.4
[58] Field of Search ............... 28/107, 103, 112, 110, 28/111, 108; 156/62.2, 148, 167, 181, 441; 226/5; 65/2, 11, 4.1, 4.4

[56] References Cited

U.S. PATENT DOCUMENTS

| | | | |
|---|---|---|---|
| 2,339,431 | 1/1944 | Slayter | 28/107 |
| 2,931,421 | 4/1960 | Schuller | 28/103 |
| 3,031,733 | 5/1962 | Ljung et al. | 28/104 |
| 3,040,412 | 6/1962 | Russell | 28/104 |
| 3,516,809 | 6/1970 | Underwood et al. | 65/9 |
| 3,551,265 | 12/1970 | Jackson | 28/104 |
| 3,597,175 | 8/1971 | Pitt | 28/103 |
| 3,883,333 | 5/1975 | Ackley | 28/107 |
| 3,999,971 | 12/1976 | Drummond | 28/103 |
| 4,315,789 | 2/1982 | Tongel | 28/107 |

*Primary Examiner*—Werner H. Schroeder
*Assistant Examiner*—Amy Brooke Vanatta
*Attorney, Agent, or Firm*—Nixon & Vanderhye

[57] ABSTRACT

In a method of and an apparatus for manufacturing a glass fiber mat, bundles of glass fibers shake down onto a conveyor unit arranged horizontally, to form a non-oriented fiber layer. The non-oriented fiber layer is dried by a drier. Bundles of uni-directional fibers are supplied onto the dried non-oriented fiber layer, by a bundle supply device, to laminate the uni-directional fiber layer onto the dried non-oriented fiber layer. At the laminating, the bundles of uni-directional fibers are guided in parallel relation to each other at regular intervals in a widthwise direction of the conveyor unit. The uni-directional and non-oriented fiber layers, which are laminated one upon the other, are supplied to a needler and are needled thereby, to form the glass fiber mat. The glass fiber mat is carried out by a delivery roller unit.

28 Claims, 9 Drawing Sheets

METHOD OF AND APPARATUS FOR MANUFACTURING GLASS FIBER MAT

BACKGROUND OF THE INVENTION

The present invention relates to a method of and an apparatus for manufacturing a glass fiber mat, in which a uni-directional fiber layer and a non-oriented or random fiber layer, which are laminated one upon the other, are needled to manufacture the glass fiber mat.

A manufacturing line for a glass fiber mat is arranged as follows. That is, a uni-directional fiber layer and a non-oriented or random fiber layer are laminated one upon the other, the laminated element is needled by a needler, and the uni-directional fiber and the non-oriented fiber layer are intertwined with each other, to manufacture a united glass fiber mat.

The conventional apparatus for manufacturing a glass fiber mat is shown in FIG. 13 of the attached drawings. In this case, at an initial or start-up end section of a mat manufacturing line, bundles of uni-directional fibers 2 are first supplied onto a belt conveyor 3 from a warp beam 1 about which bundles of glass fibers such as cakes, rovings or yarns are wound, to form a uni-directional fiber layer. Bundles of continuous long-fibers 4 shake down in random onto the uni-directional fiber layer to laminate a non-oriented fiber layer 5 thereon. Subsequently, the laminated element consisting of the uni-directional fiber layer and the non-oriented fiber layer 5 is passed through a dryer 6 and is dried thereby. The laminated element is fed to a needler 7 by which the uni-directional fiber layer and the non-oriented fiber layer 5 are intertwined with each other by means of needling. By doing so, the uni-directional fiber layer and the non-oriented fiber layer 5 are united together to form a glass fiber mat.

The glass fiber mat is used to manufacture an FRTP stampable sheet or plate, for example. The stampable sheet is manufactured such that the glass fiber mat is impregnated with a molten resin, by the well-known method as disclosed in Japanese Patent Publication No. SHO 63-15135, Japanese Patent Provisional Publication No. SHO 61-112642, the periodical "Plastic Age", pp 194, issued on April 1989, or the like. Further, the stampable sheet is cut or severed into a plurality of sheet elements each having a predetermined dimension or size, The stampable sheet is stamping-molded to a molded article such as a bumper beam for a vehicle or the like, which has high strength and high elasticity in one direction.

The molded article that is a final product, for example, the bumper beam, must be stable in performance, for example, in flexural strength of rupture. To this end, it is necessary that the bundles of glass fibers of the uni-directional fiber layer are regularly or orderly oriented in a direction in which the strength of the molded article is required. This is similarly required in the stampable sheet that is the plate for the molded article, or in the glass fiber mat which is employed to manufacture the stampable sheet. In short, it is necessary that, when the uni-directional fiber layer and the non-directional fiber layer are intertwined with each other by needling to form the glass fiber mat, the glass fiber bundles forming the uni-directional fiber layer are oriented in parallel relation to each other and equidistantly spaced apart as far as possible, in other words, without skewing or meandering, in the widthwise direction of the mat. The performance of the molded article depends upon the uniformity in orientation.

For the conventional method, however, the following problems arise. That is, although the glass fiber bundles are uniformly oriented in the widthwise direction of the mat at an entrance for the conveyor, when the non-oriented fiber layer shakes down onto the uni-directional fiber layer, is superimposed thereupon and passes through the dryer, the orientation is disturbed under the influence of hot air. Further, as the non-oriented fiber layer and the uni-directional fiber layer travel together with the conveyor and come to a location short of the needler, the orientation is further disturbed by vibration of the needler. Since, in the glass fiber mat needled under this condition, the glass fiber bundles forming the uni-directional fiber layer are extremely irregular or non-uniform in orientation, it is impossible for the stampable sheet produced by the use of the mat, to produce a molded article having its stable performance.

SUMMARY OF THE INVENTION

It is therefore an object of the invention to provide a method of and an apparatus for manufacturing a glass fiber mat, in which bundles of glass fibers are oriented in parallel relation to each other and equidistantly spaced apart in a widthwise direction of the mat.

It is another object of the invention to provide a method of and an apparatus for manufacturing a glass fiber mat, in which it can be dispensed with to rewind bundles of glass fibers about a warp beam, and it is made possible to continuously manufacture the glass fiber mat.

According to the invention, there is provided a method of manufacturing a glass fiber mat, comprising the steps of:

shaking down bundles of glass fibers onto conveyor means, to form a non-oriented fiber layer;

drying the non-oriented fiber layer;

supplying bundles of uni-directional fibers onto the dried non-oriented fiber layer to laminate a uni-directional fiber layer onto the dried non-oriented fiber layer, so that during lamination the bundles of uni-directional fibers are provided in parallel relation to each other and equidistantly spaced apart in a widthwise direction of the conveyor means; and needling the uni-directional and non-oriented fiber layers, which are laminated one upon the other, to form the glass fiber mat.

Preferably, the method includes the steps of:

supplying the uni-directional and non-oriented fiber layers, which are laminated one upon the other, to a needler to needle the uni-directional and non-oriented fiber layer, to form the glass fiber mat; and carrying the glass fiber mat out of the needler by delivery means.

Preferably, the step of supplying the bundles of uni-directional fibers onto the dried non-oriented fiber layer includes:

drawing the bundles of glass fibers from glass-fiber reel means;

spacing the bundles of glass fibers from each other at intervals of predetermined numbers, to guide the same to feed roller means; and leading the bundles of glass fibers to guide means to supply the bundles of uni-directional fibers onto the dried non-oriented fiber layer under such a condition that the bundles of uni-directional fibers are linearly arranged.

Preferably, the glass-fiber reel means is one of glass-fiber rovings, cakes and yarns.

Preferably, the bundles of glass fibers are spaced from each other by a plurality of pipes.

Preferably, the bundles of glass fibers are spaced from each other by guide means.

Preferably, the guide means includes a comb-type guide.

According to the invention, there is further provided an apparatus for manufacturing a glass fiber mat, comprising:

conveyor means;

first bundle supply means for shaking down bundles of glass fibers onto the conveyor means to form a non-oriented fiber layer;

drying means arranged in front of the first bundle supply means, for drying the non-oriented fiber layer;

second bundle supply means arranged in front of the drying means, for supplying bundles of uni-directional fibers onto the non-oriented fiber layer to form a uni-directional fiber layer;

guide means for guiding the bundles of uni-directional fibers supplied from the second bundle supply means, in parallel relation to each other at regular intervals in a widthwise direction of the conveyor means;

tension application means for applying predetermined tension to the bundles of uni-directional fibers supplied from the second bundle supply means;

needler means arranged in front of the second bundle supply means, for needling the uni-directional fiber layer and the non-oriented fiber layer, which are laminated one upon the other, to intertwine the uni-directional fiber layer and the non-oriented fiber layer with each other; and delivery means arranged in front of the needler means, for carrying out the glass fiber mat out of the conveyor means.

Preferably, the second bundle supply means includes a warp beam about which the bundles of uni-directional fibers are wound.

Preferably, the apparatus further includes reel means about which the bundles of uni-directional fibers are wound. The second bundle supply means comprises guide means for guiding the bundles of uni-directional fibers from the reel means, and feed roller means rotatively driven for supplying the bundles of uni-directional fibers onto the non-oriented fiber layer.

Preferably, the tension application means comprises electromagnetic clutch means mounted to the warp beam. The electromagnetic clutch means operates in synchronism with the delivery means which moves in intermittent rotation, to cause braking action. The braking action applies tension to the bundles of uni-directional fibers.

Preferably, the tension application means comprises electromagnetic clutch means mounted to the feed roller means. The electromagnetic clutch means operates in synchronism with the delivery means which moves in intermittent rotation, to cause an braking action. The braking action applies tension to the bundles of uni-directional fibers.

Preferably, the tension application means comprises rotational drive means for the warp beam. The rotational drive means is rotated at speed substantially the same as mean taking-over speed of the delivery means which moves in intermittent rotation, to apply the tension to the bundles of uni-directional fibers.

Preferably, the tension application means comprises rotational drive means for the feed roller means. The rotational drive means is rotated at speed substantially the same as the winding speed of the delivery means which moves in intermittent rotation, to apply the tension to the bundles of uni-directional fibers.

Preferably, the tension application means comprises tension roller means which is so arranged as to be urged against the bundles of uni-directional fibers.

Preferably, the guide means includes a comb-type guide.

Preferably, the delivery means includes a delivery roller assembly.

Preferably, the apparatus further includes reel means about which the bundles of uni-directional fibers are wound. The second bundle supply means includes:

shelf means on which the reel means is mounted;

first guide means for guiding the bundles of uni-directional fibers drawn from the reel means;

feed roller means to which the bundles of uni-directional fibers are supplied through the first guide means; and second guide means for retaining orientation of the bundles of uni-directional fibers supplied from the feed roller means to the needler means.

Preferably, the first guide means includes a pipe means having a guide means.

Preferably, the pipe means includes a plurality of straight pipes receiving the bundles of uni-directional fibers from the reel means, and a plurality of flexible pipes connected respectively to the straight pipes. Each of the flexible pipes has its inner wall surface which is corrugated in configuration.

Preferably, the feed roller means includes at least two rollers each of which is covered with rubber. The second bundle supply means further includes entrance guide means for the bundles of uni-directional fibers. The entrance guide means is arranged short of a first one of the rollers. The entrance guide means has its center line which is directed in a tangent-line direction of the first roller.

Preferably, the second bundle supply means further includes guide means arranged between the first roller and the entrance guide means, for orienting the bundles of uni-directional fibers.

Preferably, ones of rovings, cakes and yarns are wound about the reel means.

Preferably, the second guide means includes a comb-type guide having a plurality of teeth which are variable in pitch.

BRIEF DESCRIPTION OF THE DRAWINGS

FIG. 10b is a fragmentary enlarged diagrammatic view of one of feed rollers forming the feed roller assembly illustrated in FIG. 10a;

FIG. 11 is an enlarged perspective view of the feed roller assembly illustrated in FIG. 10a;

DESCRIPTION OF THE EMBODIMENTS

Figure 1:
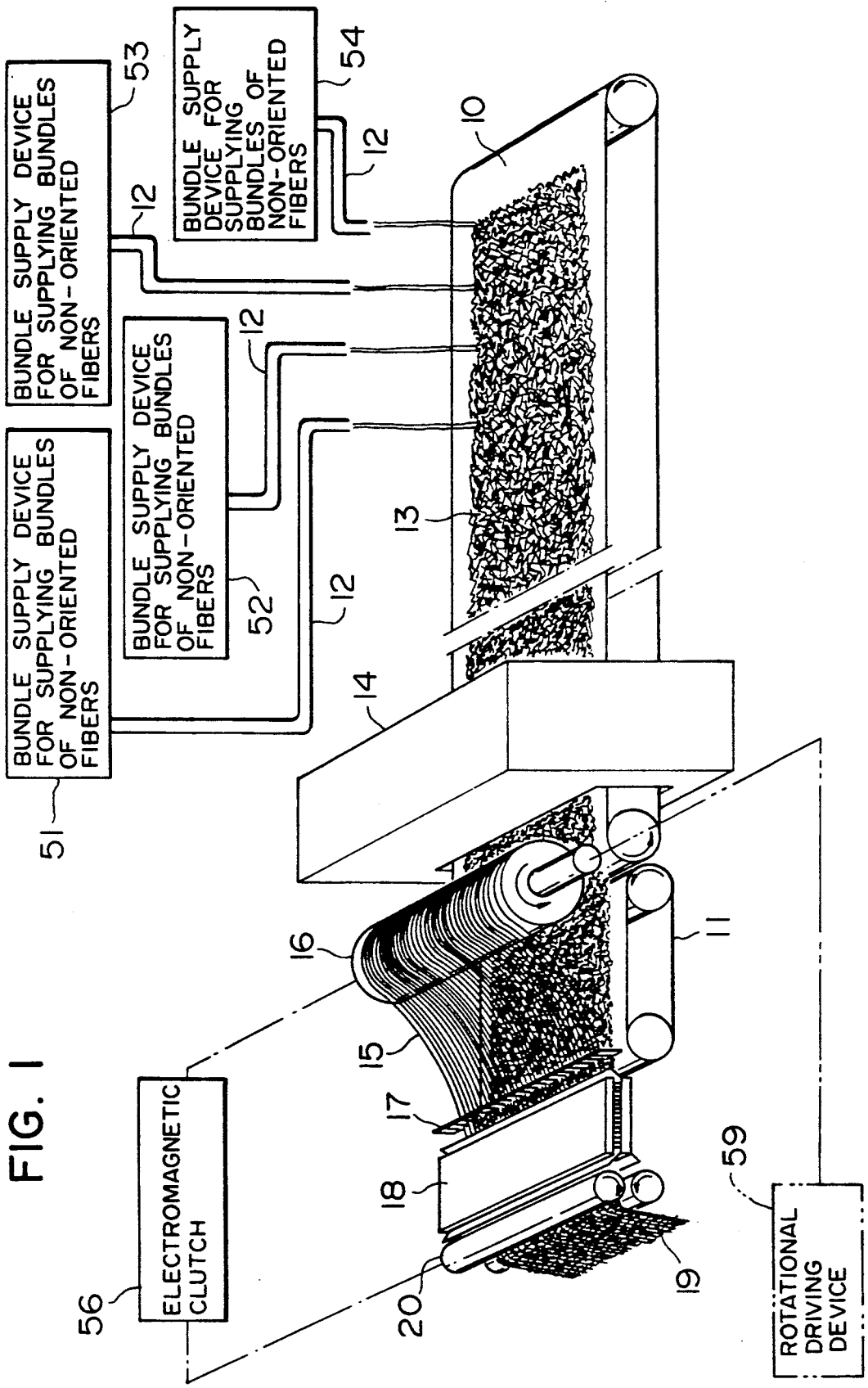
FIG. 1 is a perspective view of an apparatus for manufacturing a glass fiber mat, according to a first embodiment of the invention.

Referring first to FIG. 1, there is shown an apparatus for manufacturing a glass fiber mat, according to a first embodiment of the invention. The manufacturing apparatus comprises a pair of belt conveyors 10 and 11 which are arranged in series and substantially horizontally. The belt conveyor 10 has its initial or start-up end region, or the right-hand region in FIG. 1, at which a plurality of, four in the illustrated embodiment, supply devices 51, 52, 53 and 54 are arranged for supplying bundles of non-oriented fibers. By the supply devices 51 through 54, bundles of continuous glass long-fibers 12 shake down in random onto the belt conveyor 10 to form a non-oriented fiber layer or random fiber layer 13. The supply devices 51 through 54 are arranged in equidistantly spaced relation to each other along the transport direction of the belt conveyor 10, and are so arranged as to cause the bundles of continuous glass fibers 12 to fall down spirally while being reciprocated at a predetermined speed in the widthwise direction of the belt conveyor 10. In this connection, reference should be made to Japanese Patent Publication No. SHO 63-6660, for example. Each of the bundles of continuous glass fibers 12 is composed of, for example, a bundle of four-hundred (400) filaments whose single fiber or filament yarn diameter is twenty-three (23) $\mu$m. The bundles of continuous glass fibers 12 shake down onto the belt conveyor 10 such that the weight per unit area of the non-oriented fiber layer 13 is brought to 440 g/m$^2$, for example.

The thus formed non-oriented fiber layer 13 is transported by the belt conveyor 10 and passes through a dryer 14. The dryer 14 is so arranged as to blow heated or hot air of about 50° C. against the non-oriented fiber layer 13 to dry the same.

Subsequently, the non-oriented fiber layer 13 is transferred to the belt conveyor 11. In a terminating end region of the belt conveyor 11, bundles of uni-directional fibers 15 are supplied onto the non-oriented fiber layer 13 from a warp beam 16. Bundles of glass fibers such as cakes, rovings or yarns, whose single filament diameter is 23 $\mu$m, whose number of bundled filaments is 2000 and whose moisture content is 4% through 5%, for example, are beforehand wound about the warp beam 16 by a width of 2.2 m, with a pitch of 4 mm, with the number of 540 and with the length of about 200 m. The warp beam 16 is rotatably supported or born by a shaft, and an electromagnetic clutch 56 is mounted to the shaft for braking the rotation of the warp beam 16. The electromagnetic clutch 56 operates in synchronism with a delivery roller assembly 20 to be described later, which moves in intermittent rotation, to apply tension to the bundles of uni-directional fibers 15. However, the warp beam 16 may be rotated by a rotational drive device 59 illustrated in FIG. 1 in double dotted lines. In this case, the warp beam 16 is rotated at its speed substantially identical with an average winding speed of the delivery roller assembly moving in intermittent rotation, and serves also as means for applying tension to the bundles of uni-directional fibers.

The bundles of uni-directional glass fibers 15 drawn from the warp beam 16 pass through a comb-type guide 17 and, subsequently, are supplied onto the non-oriented fiber layer 13. The comb-type guide 17 has an elongated body and a plurality of comb teeth mounted thereto, and it is preferable that the comb teeth are variable in pitch. A single bundle of uni-directional fibers 15, or two bundles of uni-directional fibers 15 may pass through a corresponding one of the comb teeth of the comb-type guide 17. The comb-type guide 17 is well known per se in the field of the textile industry, and will not be described in detail here.

Subsequently, the uni-directional fiber layer and the non-oriented fiber layer 13, which are laminated one upon the other, are supplied to a needler 18 where the uni-directional fiber layer and the non-oriented fiber layer 13 are needled such that needles are pierced into them from the side of the uni-directional fiber layer. By doing so, both the layers are intertwined with each other and are united together, thereby forming a glass fiber mat 19. The needler 18 is well known per se, and will not be described in detail here.

Arranged at an exit of the needler 18 is a delivery roller assembly 20 for carrying the glass fiber mat 19 out of the needler 18. The delivery roller assembly 20 is rotatively driven intermittently.

In the case of the glass-fiber-mat manufacturing apparatus constructed as described above, since the warp beam 16 that is the bundle supply device for supplying the bundles of uni-directional fibers 15 is arranged between the dryer 14 and the needler 18, orientation of the bundles of uni-directional fibers 15 is not disturbed by blowing of the hot air from the dryer 14. Further, since the bundles of uni-directional fibers 15 are guided through the comb-type guide 17 and tension is applied to the bundles of uni-directional fibers 15, the latter can be guided and supplied in parallel relation to each other and in equidistantly spaced relation to each other. Thus, even if the bundles of uni-directional fibers 15 are subjected to vibration of the needler 18, the bundles of uni-directional fibers 15 can be oriented on the non-oriented fiber layer 13 straight without skewing or meandering.

Application of the tension due to the electromagnetic clutch 56 is practiced as follows. That is, the electromagnetic clutch 56 becomes weak in braking force when the delivery roller assembly 20 is rotated, to apply predetermined or constant tension to the bundles of uni-directional fibers 15. When the delivery roller assembly 20 stops in rotation, the braking force of the electromagnetic clutch 56 increases, to stop or halt rotation of the warp beam 16.

On the other hand, application of the tension due to the rotational drive device 59 associated with the warp beam 16 is practiced as follows. That is, since the warp beam 16 is rotatively driven at speed substantially identical with the average winding speed of the delivery roller assembly 20 which moves in rotation intermittently, the bundles of uni-directional fibers 15 slacken during stop of the delivery roller assembly 20. Since, however, the bundles of uni-directional fibers 15 are tensioned or tightened when the delivery roller assembly 20 is again rotated, there is no problem in that the bundles of uni-directional fibers 15 are oriented uniformly.

Figure 2:
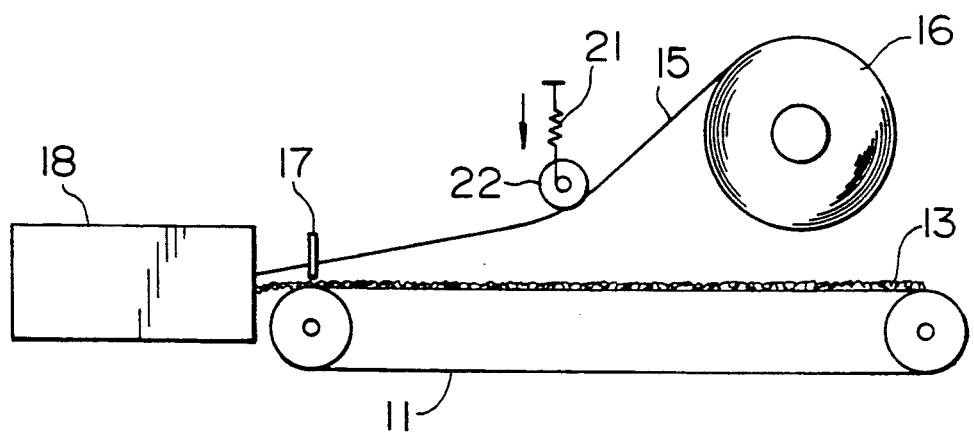
FIG. 2 is a somewhat diagrammatic side elevational view showing an example of a device for applying tension to bundles of uni-directional fibers.
Figure 3:
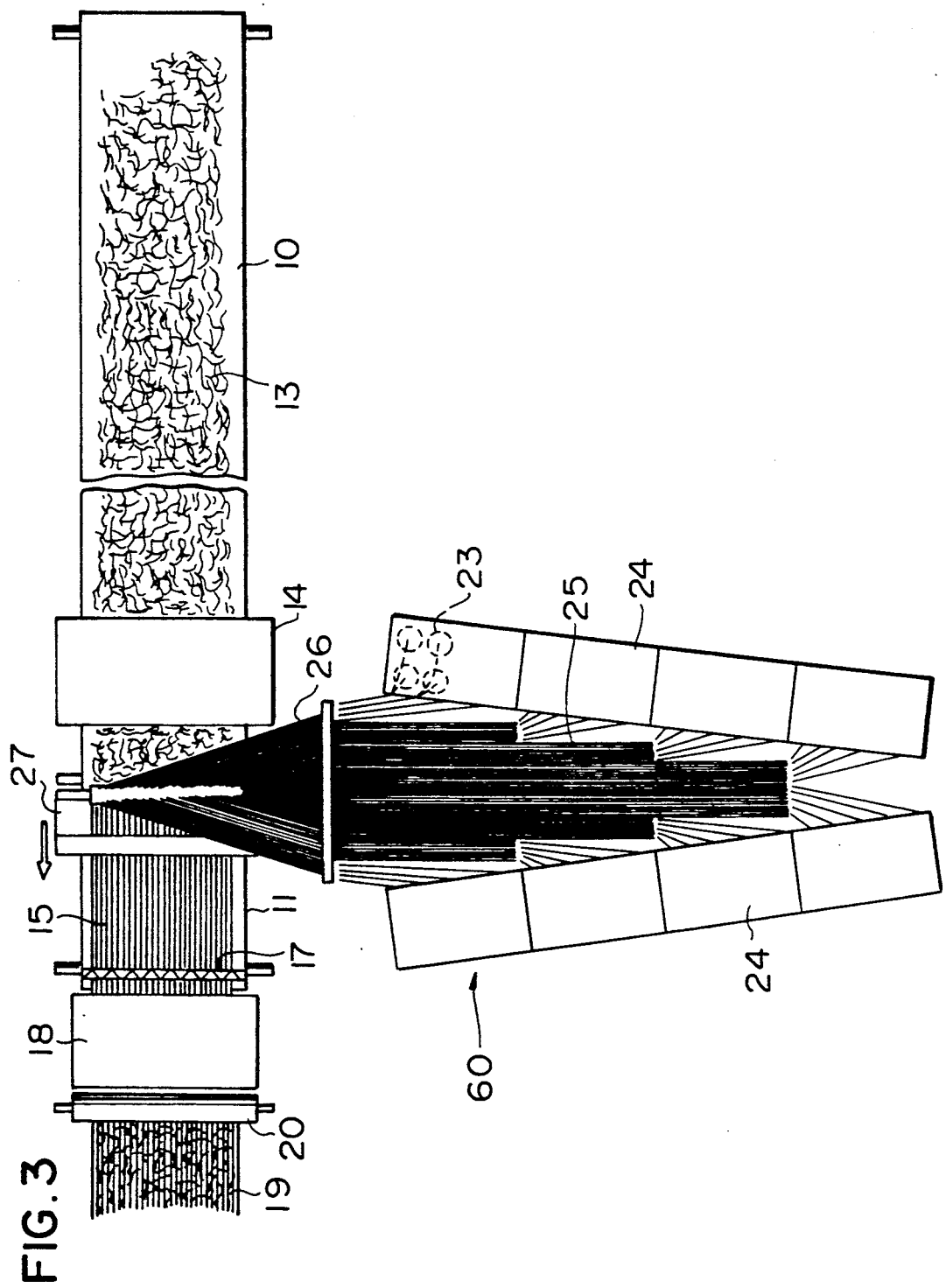
FIG. 3 is a top plan view of an apparatus for manufacturing a glass fiber mat, according to a second embodiment of the invention.

FIG. 2 shows another device for applying tension to the bundles of uni-directional fibers 15. The tension application device comprises a tension roller 22 which is biased by a coil spring 21 such that the tension roller 22 is lightly urged against the bundles of uni-directional fibers 15 drawn from the warp beam 16. In this case, the tension roller 22 may be supported or born rotatably by bearings, or may not be rotated. Further, the arrangement may be such that tension is applied to the bundles of uni-directional fibers 15 due only to the gravitational weight of the tension roller 22, without the use of the spring 21.

Referring next to FIGS. 3 through 12, there is shown an apparatus for manufacturing a glass fiber mat, according to a second embodiment of the invention. In this connection, components and parts like or similar to those illustrated in FIGS. 1 and 2 are designated by the same or like reference numerals, and the description of the like or similar components and parts will be omitted or simplified to avoid repetition.

In the case of the warp beam 16 serving as the bundle supply device illustrated in FIGS. 1 and 2, steps are required first for preparing a plurality of bundles of glass fibers such as rovings, cakes or yarns, once for uniformizing tension applied respectively to the glass-fiber bundles, for orienting the glass-fiber bundles in parallel relation to each other, and for rewinding the glass-fiber bundles about the warp beam 16. This increases the cost, and is not economical. Further, manufacturing or production of the glass fiber mat is restricted by the length, for example, 200 m of the glass fibers wound about the warp beam 16. When the bundles of glass fibers wound about the warp beam 16 are set up or spent all, manufacturing must once stop to replace the warp beam by new one. The replacing operation must be practiced in the following manner. That is, 540 bundles of glass fibers are re-tied or refastened one by one and are passed through the comb-type guide 17. The bundles of glass fibers are adjusted also in length such that constant or predetermined tension is applied to the bundles of glass fibers. These series of operations take a few hours, and are extremely inferior in efficiency or performance.

A bundle supply device 60 for supplying bundles of uni-directional fibers, in the second embodiment illustrated in FIGS. 3 through 12, is arranged such that, in order to eliminate the drawbacks or disadvantages described previously, the bundles of glass fibers such as rovings, cakes or yarns are not rewound about the warp beam, but are directly supplied to the needler 18.

The bundle supply device 60 comprises substantially a plurality of shelves 24 on which a plurality of reels 23 of rovings, cakes or yarns are mounted, hard straight pipes 25 for guiding the bundles of glass fibers or bundles of uni-directional fibers 15 drawn from the reels 23 of rovings, cakes or yarns, flexible pipes 26 connected respectively to the pipes 25, and a feed roller assembly 27 to which the bundles of glass fibers are supplied from the flexible pipes 26.

Figure 4:
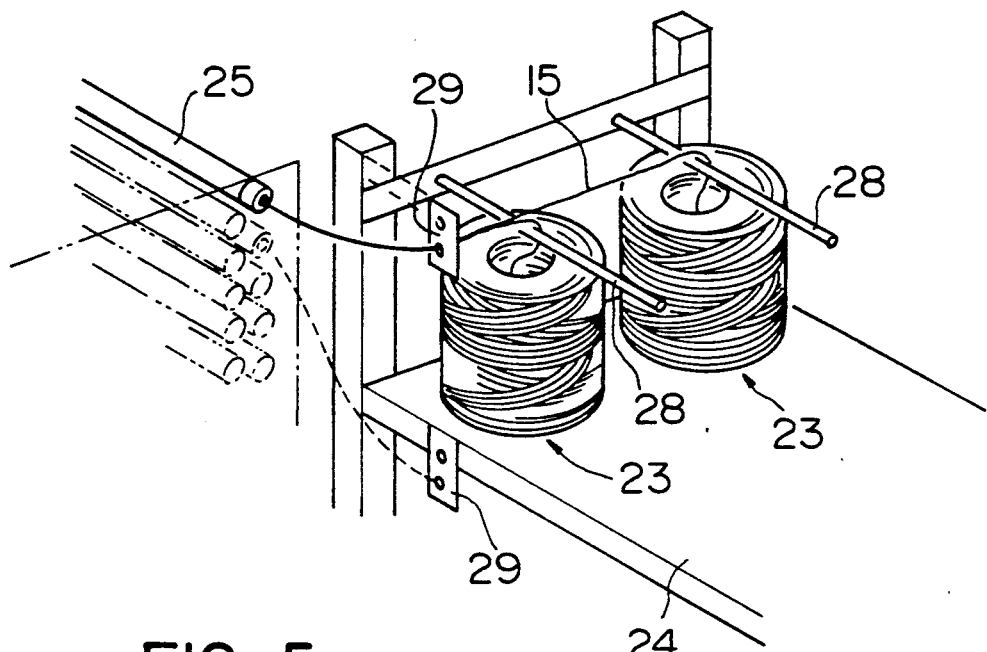
FIG. 4 is a fragmentary enlarged perspective view of the manufacturing apparatus illustrated in FIG. 3, showing the positional relationship among roving reels, shelves and hard pipes of a bundle supply device for supplying bundles of uni-directional fibers.
Figure 5:
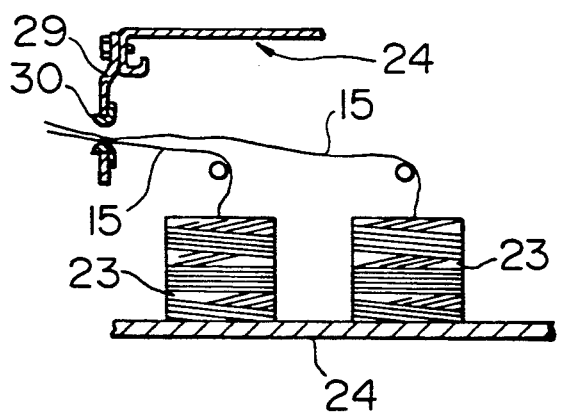
FIG. 5 is a fragmentary side elevational view of the bundle supply device illustrated in FIG. 4.
Figure 6:
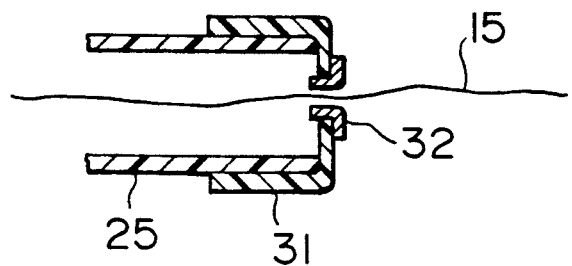
FIG. 6 is a fragmentary enlarged cross-sectional view of an entrance of the hard pipe illustrated in FIG. 4.
Figure 7A:
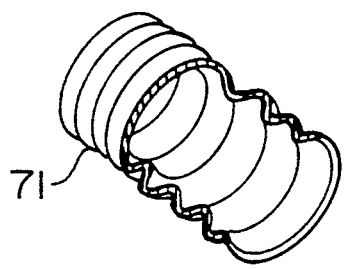
FIGS. 7a through 7e are fragmentary enlarged cross-sectional view showing various examples of a flexible pipe illustrated in FIG. 3.
Figure 7B:
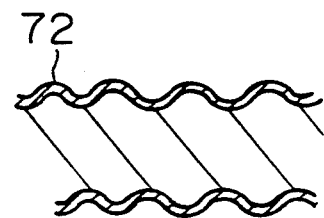
Figure 7C:
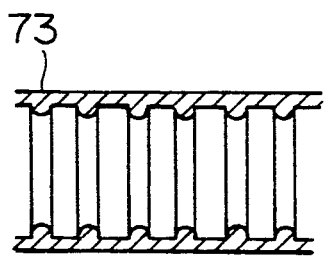
Figure 7D:
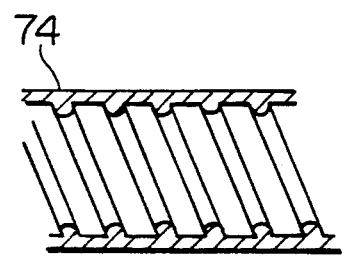
Figure 7E:
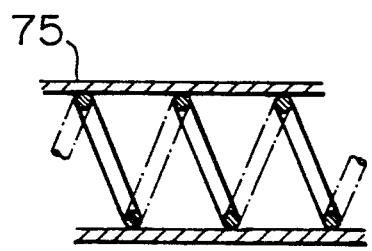

The shelves 24, on which the reels 23 of rovings, cakes or yarns are mounted, are arranged at a location remote from the mat manufacturing line in the form of a letter V, for example. As shown in FIGS. 4 and 5, each of the bundles of glass fibers 15 is drawn from a corresponding one of the reels 23 of rovings, cakes or yarns, straddles over a guide rod 28 made of stainless steel, and passes through a bore in a guide plate 29 such that two bundles are handled together. The guide plate 29 is fixedly mounted to a side face of the shelf 24 by means of screws or the like. A plurality of titania ceramics guides 30 are mounted respectively to the bores. Subsequently, as shown in FIG. 6, the bundle of glass fibers 15 is led into the straight pipe 25 which has its forward end having mounted thereto a cap 31 and a titania ceramics guide 32 and which is made of hard polyvinyl chloride (PVC).

Here, if the individual bundles of glass fibers are not spaced from each other by the pipes 25, the bundles of glass fibers 15 would be brought to such a condition as to be tightly stretched at drawing, or to such a condition as to largely hang down. The bundles of glass fibers will be mingled with each other and will get entangled. Thus, the bundles of glass fibers 15 will advance while being rubbed against each other, cutting of a single yarn will occur, and fluff will be generated. At last, the bundles of glass fiber 15 will be cut or severed. The aforesaid polyvinyl chloride pipes 25 serve to space the bundles of glass fibers 15 from each other to prevent occurrence of such trouble.

Furthermore, when the bundles of glass fibers 15 move vertically, the tension applied to the bundles of glass fibers 15 also varies. That is, when the bundles of glass fibers largely hang down, the tension will become large, while, when the hanging-down is small, the tension will also be small. As described previously, however, when the bundles of glass fibers 15 are taken over through the straight pipes 25, it is possible to minimize the range within which the bundles of glass fibers 15 move vertically, making it possible to reduce variation or fluctuation in tension.

A material of the pipes 25 suited for these purposes may be a metal or plastic material. If, however, the pipes are made of a metal material, the pipes will become heavy, and a frame for suspending the pipes will have to become strong and durable. Further, it will be required to select pipes which have their resistant force against corrosion or erosion due to peroxide contained in a binder for the bundles of glass fibers. On the other hand, if the pipes 25 are made of a plastic material, the pipes 25 may be ones made of a hard plastic material having no tack. If the pipes 25 are made of the hard plastic material, the pipes 25 are light in weight, a frame for the pipes 25 may be one simple in construction, and there is no fear of corrosion or erosion. If each of the pipes 25 has its smooth inner wall surface, the pipes 25 may be ones made of fluorine resin, olefinic resin, polyvinyl chloride (PVC), ABS, polycarbonate (PC), acrylic resin or the like, for example. Particularly, pipes made of hard polyvinyl chloride, which is commercially available widely for piping, are suitable as the pipes 25 from the viewpoints of cost and performance.

The bundles of glass fibers, which have come out of the straight pipes 25, pass through the flexible pipes 26. Each of the flexible pipes 26 has its inner wall surface which describes a gentle curve and which is wavy or corrugated in configuration. The bundles of glass fibers are led to the feed roller assembly 27. The flexible pipes 26 have their roles which reduce wear of the bundles of glass fibers 15 as far as possible to gently alter the direction of the bundles of glass fibers 15. For this reason, it is desirable that each of the flexible pipes 26 has its inner wall surface which is corrugated in configuration so that the contact area between the bundles of glass fibers 15 and the pipes 26 is small. FIGS. 7a through 7e show various examples of each of the flexible pipes 26. In a flexible pipe 71 illustrated in FIG. 7a, corrugations are independent of each other in a ring-shaped configuration, and are formed in spaced relation to each other at regular intervals. In a flexible pipe 72 illustrated in FIG. 7b, corrugations are formed into a single thread or a plurality of threads. In a flexible pipe 73 illustrated in FIG. 7c, a plurality of ring-like projections are formed in an inner wall surface of the flexible pipe 73 in an independent manner. In a flexible pipe 74 illustrated in FIG. 7d, projections are formed into a single thread or a plurality of threads. In a flexible pipe 75 illustrated in FIG. 7e, a plurality of springs are inserted in and fixedly mounted to the flexible pipe 75.

It is preferable that the material of the flexible pipes 26 is similar to that of the straight pipes 25. That is, it is preferable that the material of the flexible pipes 26 is one which is light in weight and whose inner wall surface is finished smoothly. For example, a trade name "Miraflex® SS, MFS-16" manufactured by Mirai Kogyo Kabushiki Kaisha and commerically available widely as cable protective tubes is preferable for the flexible pipes 26.

Figure 8:
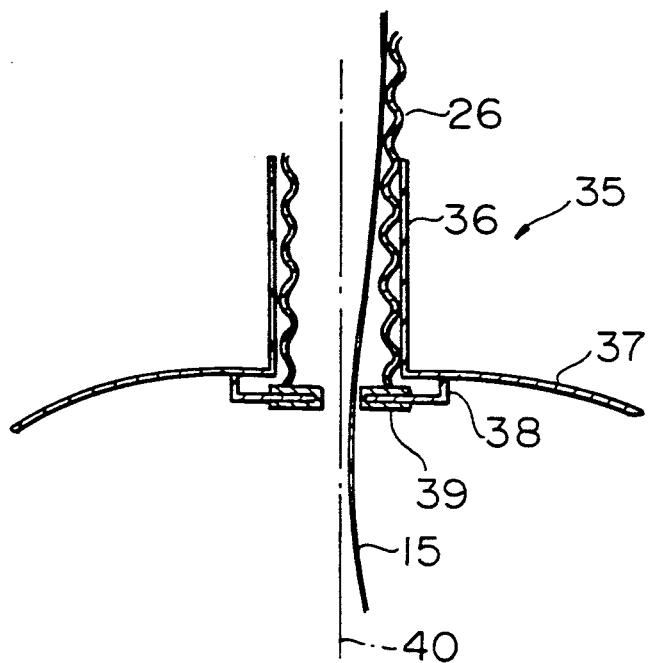
FIG. 8 is a fragmentary enlarged cross-sectional view of an entrance guide which is provided short of a feed roller assembly of the bundle supply device illustrated in FIG. 3.
Figure 9:
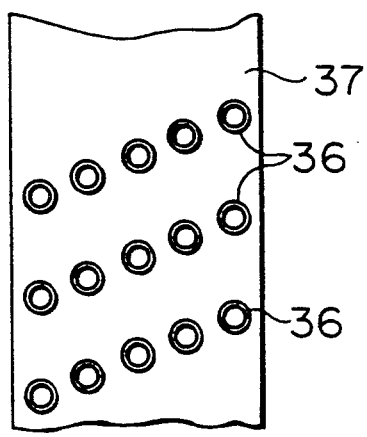
FIG. 9 is a side elevational view of an iron plate and iron pipes of the entrance guide illustrated in FIG. 8.

The bundles of glass fibers 15 are supplied to the feed roller assembly 27 from the flexible pipes 26 through an entrance guide 35 as shown in FIG. 8. Since the guide 35 is located adjacent the entrance with respect to the feed roller assembly 27, the guide 35 is referred to as "entrance guide". As shown in FIGS. 8 and 9, the entrance guide 35 comprises a plurality of iron pipes 36 each of which has its inner diameter equal to the outer diameter of a corresponding one of the flexible pipes 26, an iron plate 37 to which the iron pipes 36 are welded, and a plurality of titanium guides 39 each of which is mounted to an opening of the iron pipe 36 by a guide retainer 38. The iron plate 37 extends along the entire length of the feed roller assembly 27 subsequently to be described, and is rectangular in configuration which is curved arcuately. As shown in FIG. 9 which is a top plan view, the plurality of iron pipes 36 are arranged on and fixedly mounted to the iron plate 37 in staggered relation to each other in the widthwise direction of the iron plate 37 and in the longitudinal direction thereof. The flexible pipes 26 are inserted respectively into the individual iron pipes 36, and are fixedly mounted thereto.

Figure 10A:
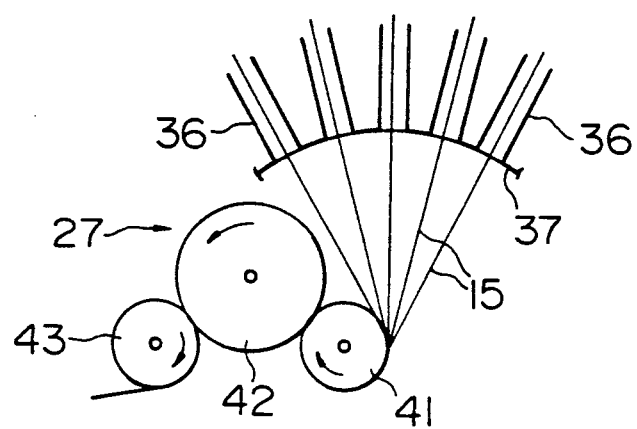
FIG. 10a is a somewhat diagrammatic side elevational view showing the positional relationship between the entrance guide illustrated in FIG. 8 and the feed roller assembly illustrated in FIG. 3.
Figure 10B:
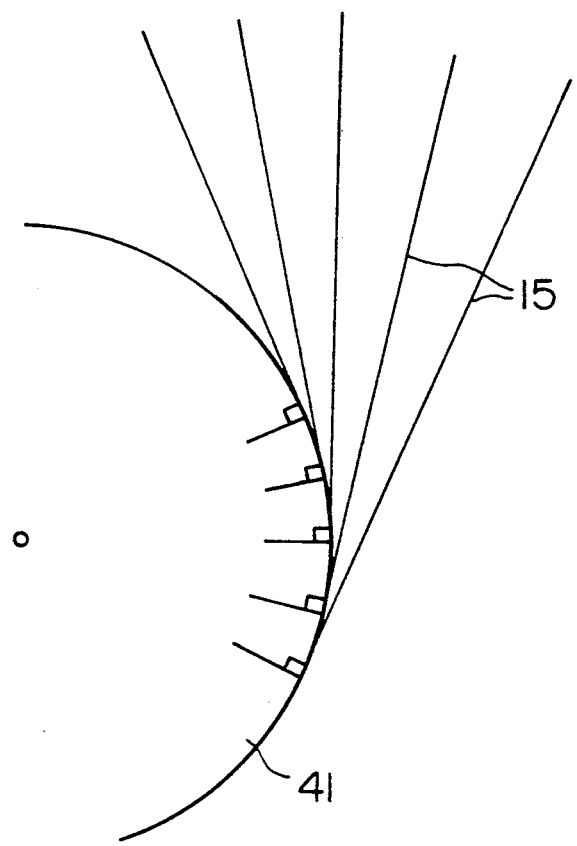

The bundles of glass fibers 15 are supplied to the feed roller assembly 27 from the flexible pipes 26 through the titania ceramics guide 39. As shown in FIG. 10a, the feed roller assembly 27 is composed of three rollers 41, 42 and 43 each of which is covered with rubber. At this time, if the iron plate 37 is planar, a center line 40 (refer to FIG. 8) of the entrance guide 35, that is, a center line of an assembly including the flexible pipes 26, the titania ceramics guide 39 and the iron pipes 36 does not coincide with or is not in agreement with the tangent line of the first roller 41 of the feed roller assembly 27. Accordingly, the bundles of glass fibers 15 will travel while being rubbed against the edge of the titania ceramics guide 39. The more the contact angle at the edge of the titanium guide 39 is large, the more fluff is generated. The generated fluff will adhere to the traveling bundles of glass fibers 15 and will move also to the surface of the feed roller assembly 27. Fluff will be successively generated. At last, the bundles of glass fibers will be served and will be wound about the feed roller assembly. In order to avoid or prevent such trouble, as shown in FIGS. 10a and 10b, the center line or normal line 40 of the entrance guide 35 is so arranged as to be coincident with the tangent line of the first roller 41 of the feed roller assembly 27. By doing so, the contact angle between the bundles of glass fibers 15 and the edge of the titania ceramics guide 39 becomes small, so that almost no fluff is generated.

Figure 11:
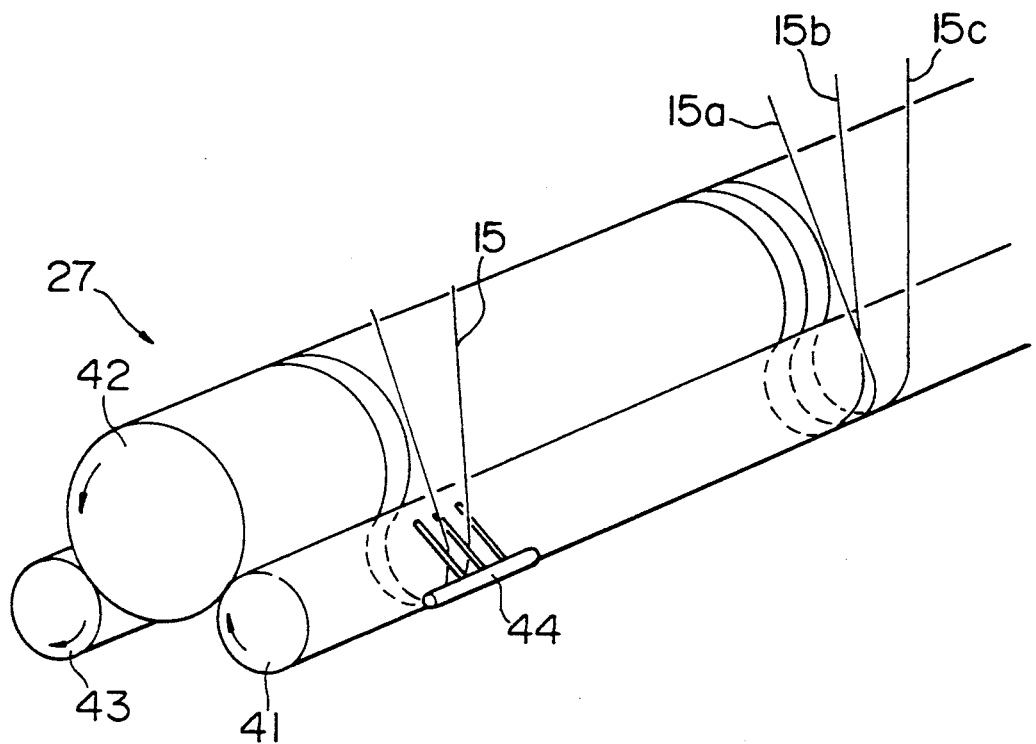
Figure 12:
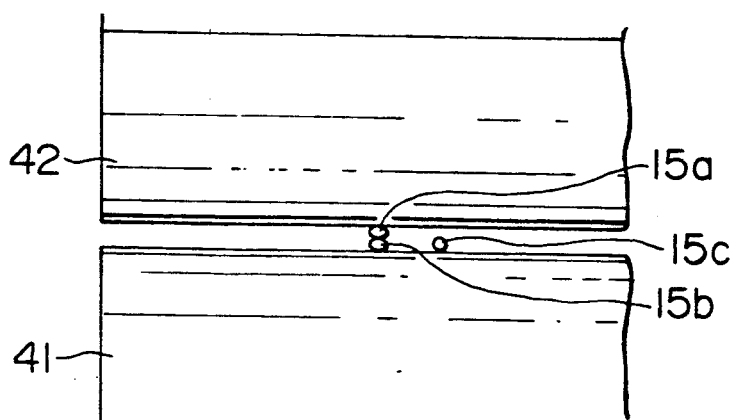
FIG. 12 is a front elevational view of the feed roller assembly illustrated in FIG. 11, showing the bundles of glass fibers which are overlapped with or superimposed upon each other in the form of lease or twill.
Figure 13:
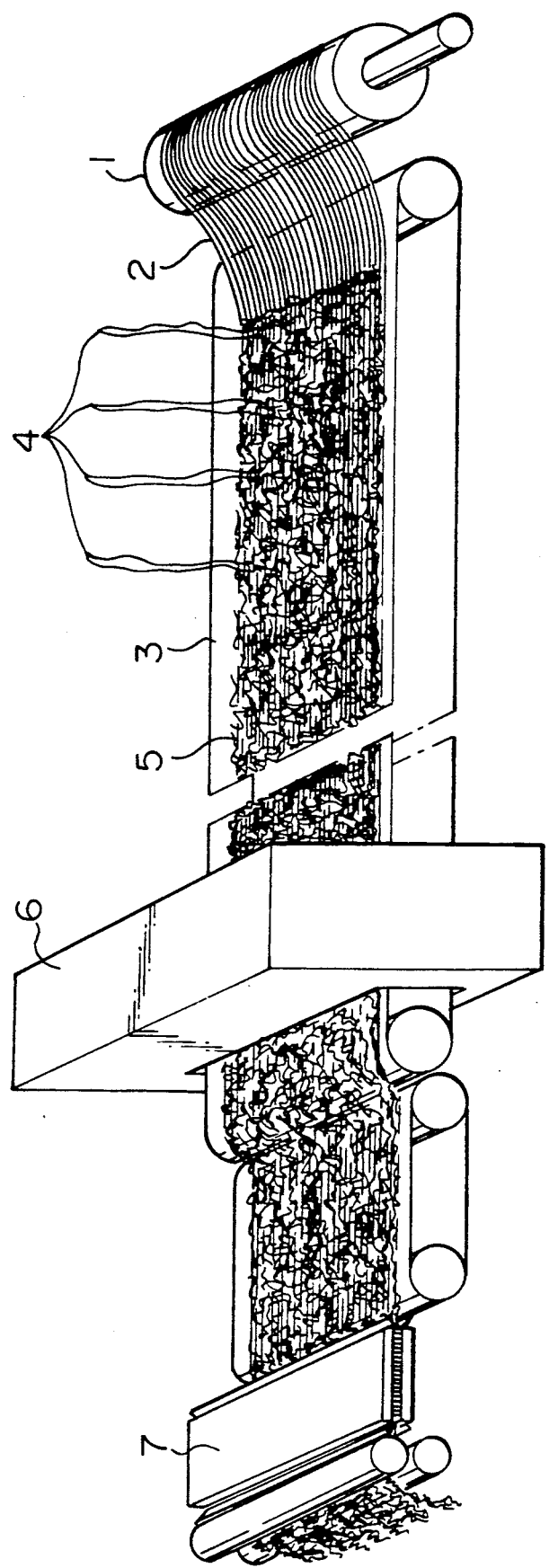
FIG. 13 is a perspective view of the conventional apparatus for manufacturing a glass fiber mat.

The glass fibers coming out of the entrance guide 35 are supplied to the feed roller assembly 27 equidistantly of the titania ceramics guides 39. Since, however, the pitch of the bundles of glass fibers 15 is extremely small or narrow such as 8 mm, there may be a case where the bundles of glass fibers will form a lease or twill at a location between the titania ceramics guides 39 and the feed roller assembly 27 as shown on the right-hand side in FIG. 11. If the bundles of glass fibers 15 are in contact with the feed roller assembly 27 while the bundles of glass fibers 15 form the lease or twill, the bundle of glass fibers 15a and the bundle of glass fibers 15b are put between the roller, for example, between the first roller 41 and the second roller 42, while the bundle of glass fibers 15a and the bundle of glass fibers 15b are superimposed upon each other or overlapped with each other, as shown in FIG. 12. The bundle of glass fibers 15c located adjacent the bundles of glass fibers 15a and 15b becomes slow in winding speed, because the force put between the first roller 41 and the second roller 42 is reduced. The supply tension to the needler 18 becomes large or increases as compared with the bundles of glass fibers sent regularly or normally. Impregnation of resin into the bundle of glass fibers 15c at manufacturing of the stampable sheet will be deteriorated, thereby preventing revelation of the strength, and thereby deteriorating the outer appearance of the molded article. In view of this, a comb-type guide 44 as shown in FIG. 11 is arranged short of the first roller 41. By the guide 44, the bundles of glass fibers 15 are taken over to the feed roller assembly 27 without the fact that the adjacent bundles of glass fibers 15 do not form the lease or twill.

The bundles of glass fibers 15 are supplied to the needler 17, at uniform orientation and tension, from the feed roller assembly 27 through the comb-type guide 17 which is provided at the entrance to the needler 18 and which is variable in pitch. By doing so, the bundles of glass fibers or bundles of uni-directional fibers 15 are laminated onto the non-oriented fiber layer 13 which is transported from the right to the left at a location below the feed roller assembly 27, and which is needled.

In the manner described above, since the rovings, cakes or yarns are directly supplied to the glass-fiber-mat manufacturing apparatus, for example, to the needler thereof, as the bundles of uni-directional fibers, a step can be dispensed with for rewinding the rovings, cakes or yarns about the warp beam. Further, the reels for the rovings, cakes or yarns are replaced by new ones as follows. That is, initial ends of the rovings, cakes or yarns of new reels are tied or fastened, in order, to the reels in which the glass fibers approach their ends. Since it is unnecessary to adjust or regulate the length and tension as is the case of the warp beam, the replacement operation is extremely simple. Furthermore, since the replacement of the reels is practiced without stop in operation of the glass-fiber-mat manufacturing equipment, it is possible to produce the glass fiber mat continuously.

As described previously, when the bundles of glass fibers 15 pass along the inner walls of the pipes 25 and 26 and through the guide, the bundles of glass fibers are rubbed and worn off. Severing or cutting of a single filament will occur frequently, and fluff will be generated. At last, the bundles of glass fiber 15 will be cut or severed. In order to prevent such cutting or severing, it is preferable that the bundles of glass fibers 15 contains water.

A sizing agent is applied to the bundles of glass fibers in accordance with its object. The bundles of glass fibers 15 converge to a single strand and are wound as cakes or rovings. The glass fibers immediately after winding have a water content of 10% through 20%. In order to bring the glass fibers into bundles of glass fibers for ordinary or normal FRP or FRTP, the bundles of glass fibers 15 are dried by a drying furnace of 100° C. to 120° C. for ten (10) to twelve (12) hours, and are packed up and forwarded or shipped. Generally, the reason why the glass fibers form a composite material and are dried is that there is a fear that resin to be composited is hydrolyzed with water, or is foamed so that the effects or advantages of the composition are marred or damaged. However, polypropylene resin is resistant to hydrolysis. Further, the manufacturing apparatus for the stampable sheet is one which acts to expel air from the glass fiber mat and, instead thereof, to push resin into the glass fiber mat. Accordingly, even if the glass fibers contains water, there is no substantial affection or influence at all. On the other hand, to a sizing agent of the glass fibers suitable for an FRTP stampable sheet whose matrix is polyolefin resin, there is added an organic peroxide, as disclosed in Japanese Patent Publication No. SHO 53-17720. When the reels such as rovings or cakes are dried under the drying condition described previously, the organic peroxide is decomposed due to heat. Thus, effects of the organic peroxide are not achieved. In view of this, normally, the bundles of glass fibers are brought to a layer-like configuration spreading thin, and hot air of 50° C. is applied to the bundles of glass fibers to dry the same. That is, the bundles of glass fibers are dried for a short period of time in configuration superior in dry efficiency, at relatively low temperature, so that the organic peroxide is not decomposed. If, however, the bundles of glass fibers are wound into configuration of rovings, it takes about ten (10) days at 50° C., and it takes about one (1) month at the normal temperature and at an airy location. This is impossible to produce the bundles of glass fibers industrially.

In the manner described above, presence of water content makes it possible to prevent the bundles of glass fibers 15 to be worn and to prevent fluff from being generated, without damaging the effects achieved by the composition or combination of the resin. In the second embodiment, the rovings are used whose water content is 12%. However, almost no fluff is accumulated onto the comb-type guide 17 variable in pitch, and there can be produced a uniform glass fiber mat. The water content immediately after production of the mat was about 5%.

In the second embodiment described above, since the rovings, cakes or yarns are directly supplied to the glass-fiber-mat manufacturing line, for example, to the needler thereof, as bundles of uni-directional fibers, the step can be dispensed with for rewinding the rovings, cakes or yarns about the warp beam. Further, the reels for the rovings, cakes or yarns are replaced by new ones as follows. That is, initial ends of the rovings, cakes or yarns of new reels are tied or fastened, in order, to the reels in which the glass fibers approach their ends. Since it is unnecessary to adjust or regulate the length and tension as is the case of the warp beam, the replacement operation is extremely simple. Further, the arrangement may be such that spare rovings, cakes or yarns are prepared on the shelves, and their winding initial ends are tied to winding terminal ends. Furthermore, since the replacement of the reels is practiced without stop in operation of the glass-fiber-mat manufacturing line, it is possible to produce the glass fiber mat continuously.

As described previously, in the second embodiment, the rovings, cakes or yarns are directly supplied to the glass-fiber-mat manufacturing line as the bundles of uni-directional fibers. Accordingly, the step is dispensed with for rewinding the rovings, cakes or yarns about the warp beam. Thus, replacement of the reels for the rovings, cakes or yarns by new ones is extremely easy and simple. Further, it is possible to continuously produce the glass fiber mat.

As described above, according to the glass-fiber-mat manufacturing method and apparatus of the first and second embodiments of the invention, since the bundle supply device is arranged between the dryer and the needler, no disturbance in orientation of the bundles of uni-directional fibers due to blowing of hot air from the dryer occurs. Further, since the bundles of uni-directional fibers are guided through the comb-type guide and tension is applied to the bundles of uni-directional fibers, the bundles of uni-directional fibers are guided and supplied in parallel relation to each other and equidistantly spaced apart, and are oriented onto the non-oriented fiber layer straight without skewing or meandering even if the bundles of uni-directional fibers are subjected to vibration of the needler.

Accordingly, it is possible to manufacture the glass fiber mat stable in performance, by the glass-fiber-mat manufacturing method and apparatus according to the first and second embodiments of the invention.

What is claimed is:

1. A method of manufacturing a glass fiber mat, comprising the steps of:
   shaking down bundles of glass fibers onto a conveyor means to form a non-oriented fiber layer;
   drying the non-oriented fiber layer;
   supplying bundles of uni-directional fibers onto the dried non-oriented fiber layer laminating the uni-directional fiber layer onto the dried non-oriented fiber layer, providing the bundles of uni-directional fibers in parallel relation to each other and equidistantly spaced apart in a widthwise direction of said conveyor means; and
   needling the uni-directional and non-oriented fiber layers, which are laminated one upon the other, to form the glass fiber mat.

2. The method according to claim 1, including the steps of:
supplying the uni-directional and non-oriented fiber layers, which are laminated one upon the other, to a needler to needle said uni-directional and non-oriented fiber layers, to form the glass fiber mat; and
carrying said glass fiber mat out of said needler by delivery means.

3. The method according to claim 1, wherein said step of supplying the bundles of uni-directional fibers onto the dried non-oriented fiber layer includes:
drawing the bundles of glass fibers from glass-fiber reel means;
spacing the bundles of glass fibers equidistantly from each other, to guide the same to feed roller means; and
leading said bundles of glass fibers to guide means to supply the bundles of uni-directional fibers onto the dried non-oriented fiber layer under such a condition that said bundles of uni-directional fibers are linearly arranged.

4. The method according to claim 3, wherein said glass-fiber reel means are glass-fiber rovings.

5. The method according to claim 3, wherein said bundles of glass fibers are spaced from each other by a plurality of pipes.

6. The method according to claim 3, wherein said bundles of glass fibers are spaced from each other by guide means.

7. The method according to claim 3, wherein said guide means includes a comb-type guide.

8. The method according to claim 3, wherein said glass-fiber reel means are cakes.

9. The method according to claim 3, wherein said glass-fiber reel means are yarns.

10. An apparatus for manufacturing a glass fiber mat, comprising:
conveyor means;
first bundle supply means for shaking down bundles of glass fibers onto said conveyor means to form a non-oriented fiber layer;
drying means arranged downstream of said first bundle supply means, for drying said non-oriented fiber layer;
second bundle supply means arranged downstream of said drying means, for supplying bundles of uni-directional fibers onto said non-oriented fiber layer to form a uni-directional fiber layer;
guide means for guiding said bundles of uni-directional fibers supplied from said second bundle supply means, in parallel relation to each other and spaced equidistantly apart in a widthwise direction of said conveyor means;
tension application means for applying predetermined tension to said bundles of uni-directional fibers supplied from said second bundle supply means;
needler means arranged downstream of said second bundle supply means, for needling said uni-directional fiber layer and said non-oriented fiber layer, which are laminated one upon the other, to intertwine said uni-directional fiber layer and said non-/oriented fiber layer with each other; and
delivery means arranged downstream of said needler means, for carrying said glass fiber mat out of said conveyor means.

11. The apparatus according to claim 10, wherein said second bundle supply means includes a warp beam about which said bundles of uni-directional fiber are wound.

12. The apparatus according to claim 10, further including reel means about which said bundles of uni-directional fibers are wound, wherein said second bundle supply means comprises guide means for guiding the bundles of uni-directional fibers from said reel means, and feed roller means rotatively driven for supplying the bundles of uni-directional fibers onto said non-oriented fiber layer.

13. The apparatus according to claim 11, wherein said tension application means comprises electromagnetic clutch means mounted to said warp beam, said electromagnetic clutch means operating in synchronism with said delivery means which moves in intermittent rotation, to cause braking action, said braking action applying tension to said bundles of uni-directional fibers.

14. The apparatus according to claim 12, wherein said tension application means comprises electromagnetic clutch means mounted to said feed roller means, said electromagnetic clutch means operating in synchronism with said delivery means which moves in intermittent rotation, to cause braking action, said braking action applying tension to said bundles of uni-directional fibers.

15. The apparatus according to claim 11, wherein said tension application means comprises rotational drive means for said warp beam, said rotational drive means being rotated at a speed substantially the same as an average winding speed of said delivery means which moves in intermittent rotation, to apply the tension to said bundles of uni-directional fibers.

16. The apparatus according to claim 12, wherein said tension application means comprises rotational drive means for said feed roller means, said rotational drive means being rotated at a speed substantially the same as an average winding speed of said delivery means which moves in intermittent rotation, to apply the tension to said bundles of uni-directional fibers.

17. The apparatus according to claim 10, wherein said tension application means comprises a tension roller means disposed at a location which is between a warp beam and a comb-type guide, so as to be urged against said bundles of uni-directional fibers.

18. The apparatus according to claim 10, wherein said guide means includes a comb-type guide.

19. The apparatus according to claim 10, wherein said delivery means includes a delivery roller assembly.

20. The apparatus according to claim 10, further including reel means about which said bundles of uni-directional fibers are wound, wherein said second bundle supply means includes:
shelf means on which said reel means is mounted;
first guide means for guiding the bundles of uni-directional fibers drawn from said reel means;
feed roller means to which said bundles of uni-directional fibers are supplied through said first guide means; and
second guide means for retaining orientation of said bundles of uni-directional fibers supplied from said feed roller means to said needler means.

21. The apparatus according to claim 20, wherein said first guide means includes a pipe means having a guide means connected to said pipe means.

22. The apparatus according to claim 21, wherein said pipe means includes a plurality of straight pipes through each of which one of the bundles of uni-directional fibers passes from said reel means, and a plurality of flexible pipes connected respectively to said straight pipes, each of said flexible pipes having an inner wall surface which is corrugated in configuration.

23. The apparatus according to claim 20, wherein said feed roller means includes at least two rollers each of which is covered with rubber, and wherein said second bundle supply means further includes entrance guide means for said bundles of uni-directional fibers, said entrance guide means being arranged short of a first one of said rollers, said entrance guide means having a center line which is directed in a tangent-line direction of said first roller.

24. The apparatus according to claim 23, wherein said second bundle supply means further includes guide means arranged between said first roller and said entrance guide means, for orienting said bundles of uni-directional fibers.

25. The apparatus according to claim 20, wherein yarns are wound about said reel means.

26. An apparatus according to claim 10, wherein said guide means has a cap connected thereto, said guide means being disposed at an angle which is coincident with a tangent line of a first roller which carries the fiber layer so that said angle between said guide means and the fiber layer is such that no fiber breakage or fluffing occurs during feeding.

27. An apparatus according to claim 26 wherein said guide means is an elongated plastic pipe.

28. A method for manufacturing a glass fiber mat, comprising the steps of:
- advancing a fiber layer having a random fiber orientation along a predetermined path;
- treating said fiber layer so as to reduce the amount of moisture contained therein;
- delivering glass fiber bundles to said fiber layer in an equidistantly spaced, linear configuration so as to insure a uniform distribution of said glass fiber bundles to said fiber layer; and
- needling said glass fiber bundles and said fiber layer so that a glass fiber mat is produced having a uniform fiber distribution thereby insuring structural integrity and uniformity of the glass fiber mat.

* * * * *